US012181839B2

(12) United States Patent
Sasso

(10) Patent No.: US 12,181,839 B2
(45) Date of Patent: Dec. 31, 2024

(54) INDICATOR DEVICE FOR WATCHMAKING

(71) Applicant: LA VALLEE S.R.L., Vertemate Con Minoprio (IT)

(72) Inventor: Luciano Sasso, Vertemate Con Minoprio (IT)

(73) Assignee: LA VALLEE S.R.L., Vertemate Con Minoprio (IT)

( * ) Notice: Subject to any disclaimer, the term of this patent is extended or adjusted under 35 U.S.C. 154(b) by 500 days.

(21) Appl. No.: 17/598,427

(22) PCT Filed: Mar. 25, 2020

(86) PCT No.: PCT/IB2020/052790
§ 371 (c)(1),
(2) Date: Sep. 27, 2021

(87) PCT Pub. No.: WO2020/201917
PCT Pub. Date: Oct. 8, 2020

(65) Prior Publication Data
US 2022/0179364 A1 Jun. 9, 2022

(30) Foreign Application Priority Data
Mar. 29, 2019 (IT) ........................ 102019000004735

(51) Int. Cl.
*G04B 19/253* (2006.01)

(52) U.S. Cl.
CPC ..... *G04B 19/2532* (2013.01); *G04B 19/2534* (2013.01); *G04B 19/2536* (2013.01); *G04B 19/2538* (2013.01); *G04B 19/25393* (2013.01)

(58) Field of Classification Search
None
See application file for complete search history.

(56) References Cited

FOREIGN PATENT DOCUMENTS

| | | | |
|---|---|---|---|
| EP | 2141557 | A2 | 1/2010 |
| EP | 2813902 | A1 | 12/2014 |

OTHER PUBLICATIONS

Translation of EP2813902, Espacenet (Year: 2024).*
International Search Report and Written Opinion for International Application No. PCT/IB2020/052790 dated Aug. 7, 2020.

* cited by examiner

*Primary Examiner* — Renee S Luebke
*Assistant Examiner* — Matthew Hwang
(74) *Attorney, Agent, or Firm* — Greer, Burns & Crain, Ltd.

(57) ABSTRACT

An indicator device for watchmaking has a drive toothed wheel which rotates a driven programme wheel is substantially a circular crown with an external toothing and an internal toothing. The latter meshes with an eccentric internal toothed wheel whose cycloidal rotary movement with a suitable transmission ratio allows the information given on the programme wheel to be indicated. The device is suitable for making perpetual calendars of the clocks.

10 Claims, 5 Drawing Sheets

INDICATOR DEVICE FOR WATCHMAKING

This Application is a United States National Stage Application under 35 U.S.C. Section 371 of International Patent Application No. PCT/IB2020/052790 filed on 25 Mar. 2020, which is hereby incorporated by reference as if fully set forth herein. This Application also claims priority to and the benefit of Italian Patent Application No. 102019000004735, filed on 29 Mar. 2019, which is also hereby incorporated by reference as if fully set forth herein.

The present invention relates in a more general aspect thereof to the control of mechanical members, such as in particular the components of mechanisms intended for watchmaking applications.

It should be pointed out from the outset that the present invention is intended for watchmaking in general and therefore it applies both to portable, wrist or pocket watches, as well as to table, wall clocks or any other application since the size or shape of the watch/clock is not relevant.

Furthermore, although the invention concerns the control of mechanical members, it must not be considered limited to entirely mechanical clocks, i.e. those with manual or automatic spring loading, but it can also be extended to clocks that have mechanical members controlled by a quartz or other system.

Therefore, when in this description and in the subsequent claims reference is made to watchmaking in general or to a form of clock, this must not be understood in a limiting way and what will be said can also be extended to other embodiments of clocks, different as to size, use, actuation.

As is known, in wristwatches, table or wall clocks, there are several members in addition to the hands, which are cyclically activated to provide indications to a user. This is the case, for example, of daters, calendars, almanacs, zodiac signs, but also of indicators of other functions, such as those of the load level of the clock, or of time zones, of time counters, etc.

These indicators are usually made up of mechanisms actuated by gear trains connected to the gear train that rotates the escapement.

An important aspect that concern these indicators and the related watchmaking mechanisms is that according to their functions they must have the possibility of providing variable indications, that is, that they are combinations of cycles with different periodicity.

This is typically the case for the calendars of the days of the months, in which there are months having 31 days, others having 30, others 28 and then, in leap years, even 29.

In some mechanical spring-loaded clocks, especially table or wall clock, there are also indicators of the load level, i.e. systems that signal how much is left before the spring load runs out, so as to prevent the clock from stopping. warning the user that it is necessary to trigger the spring.

It is evident that by increasing the number of functions, also the difficulties to be overcome increase because it is necessary to actuate a whole series of mechanical members such as ratchets, lever transmissions, cams, etc., which require not only a certain energy for their operation (thus subtracted from that for actuating the hour and minute hands), but also lubrication to reduce friction and wear.

Furthermore, increasing the complexity and/or the number of mechanisms inevitably the size of the clocks increases, as well as the assembly and production costs thereof. For this reason, perpetual mechanisms, also known as programme wheels, were developed in the past, including gear trains and gears that reduce or eliminate the presence of cam mechanisms, ratchets and springs, with the above contraindications. An example of this type of mechanism is described in the European patent application published as EP 1 351 104.

It is a mechanism made up of a series of epicyclic gear trains, in which a toothed programme wheel with a predetermined number of teeth (in this case 24 corresponding to the hours of the day) controls the gears driven in cascade, some of which are of the planetary type.

One or more of these gears are associated with hands and/or concentric discs or rings, the latter bearing the indications (name and/or number) of the days, months and years; in practice, the gear trains change the position of the concentric discs so as to bring the indications of each one, relating to a given day, month, year, in radial alignment, so that the clock hand that extends radially can provide corresponding synoptic information.

Although this solution with programme wheel is effective in providing a precise and reliable perpetual calendar, it does not however seem optimal in terms of simplifying the mechanism and reducing the size thereof.

In fact, the use of gear trains inevitably entails a certain functional rigidity of the system, because they are components that have fixed transmission ratios and therefore a corresponding gear train must be provided for each of the calendar information required.

Additionally, for the display of the information it is necessary to have dials with hands to read the indications; increasing the number of components makes reading the calendar less immediate, since the movements of the concentric discs of the dial still give a synoptic representation of the information that is not always precise.

In other words, since the hand must operate as an indicator simultaneously for the days of the week and month, for the months and for the years, which are aligned radially on the dial, the position of this information varies over time and therefore also their alignment and the resulting reading are inevitably affected by a configuration that is not entirely precise.

In light of this situation, it is therefore a technical problem underlying the present invention, that of making a mechanical device available for watchmaking of the programme wheel type, with characteristics of structure and operation such as to overcome the limits outlined above with reference to the state of the considered art.

In other words, an object of the invention is to simplify, at least in part, the programme wheel mechanism known from EP 1 351 104, so as to allow a reduction of the component parts thereof and therefore to facilitate the production of perpetual calendars including this mechanism.

The idea of solving this technical problem lies in the fact of using at least one cycloidal satellite gear, which can actuate a reduction of motion with a predetermined transmission ratio and, preferably, a contextual indication of information such as one of those of a perpetual calendar, for example the days of the week and/or month, or the month, year and the like.

The characteristics of the invention are set forth more specifically in the claims appended to this description.

These characteristics, the results that follow and the effects achieved by the invention, will become clearer from the description that is given below of a preferred and non-exclusive embodiment thereof, shown in the accompanying drawings provided by way of non-limiting example, wherein.

Figure 1:
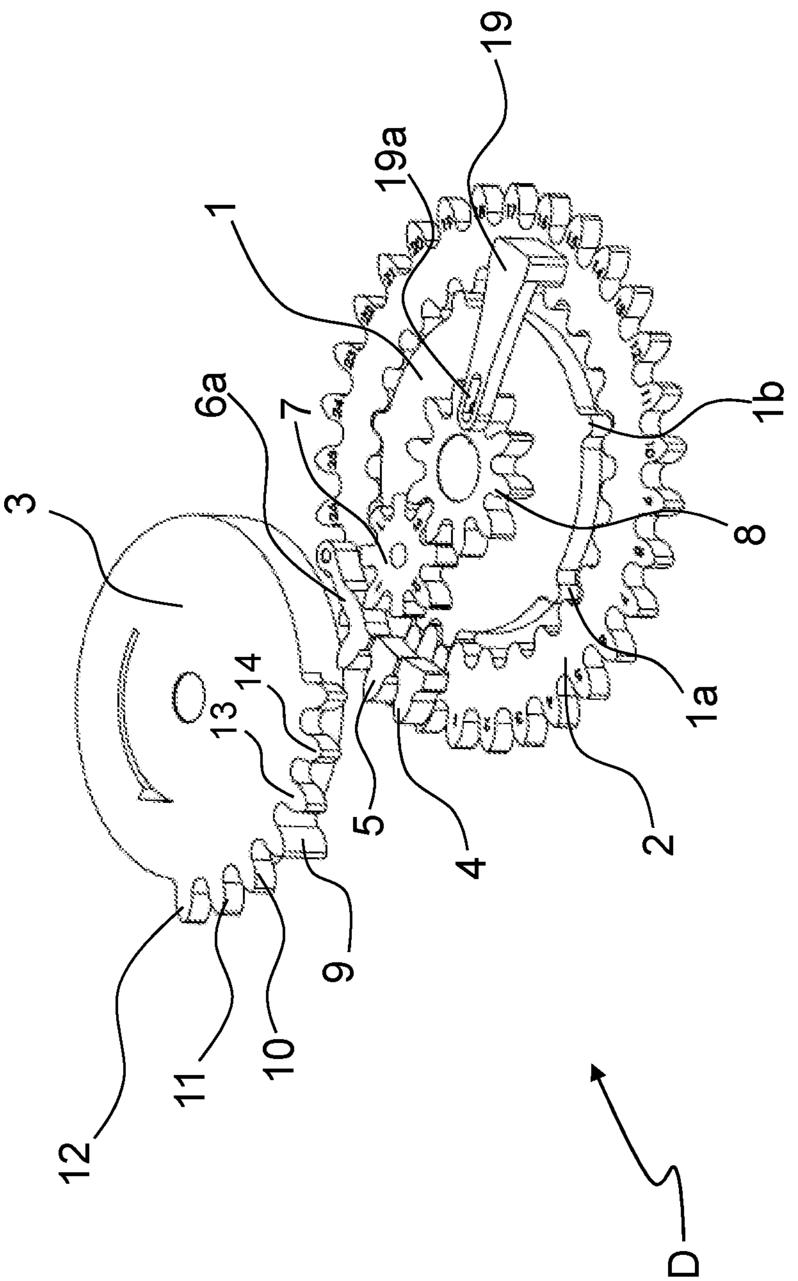
FIG. 1 shows a perspective view of a mechanical device according to the invention.

With reference to the figures listed above, they show a perpetual calendar mechanism with a programme wheel according to the invention, indicated as a whole with reference D.

In particular, as can be understood, for simplicity and clarity's sake, the figures show the necessary elements only or in any case useful for understanding the invention; with regards to the rest of the mechanism and of the clock in which it is intended to be installed, reference can be made to what is generally known in the art, including what is explained in the aforementioned publication EP 1351104.

Those skilled in the art are therefore able to implement the invention on the basis of what will be explained below, possibly with the contribution of information belonging to their common technical know-how.

From a general point of view it can be said that the operation of the mechanical device D for watchmaking is based on the cycloidal motion of a gear of the eccentric type 1, thanks to which the device D can carry out typical functions of a perpetual calendar, that is to take into account the different length of the months of the year (28, 30 and 31 days) and of the difference in the length of the month of February in leap years (29 days). Device D allows viewing information directly on the components themselves; for example in FIG. 4, the day February, 28 of a leap year is represented; in particular the day number (28) is indicated on the vertical straight line (with reference to FIG. 4) joining the rotation centres of two toothed wheels or gears 2 and 3.

The name of the month, on the other hand, is the one located at the point or indicator reference 23 below number 1 (in this example February), while the indication of the leap year is the one visible in window 24 where letter L stands for "Leap Year" (obviously other symbols and/or letters can be used to provide the indication in the most appropriate way, depending on the languages, customs, clock size and whatever).

As said, the device or clockwork mechanism D comprises a driven wheel or gear 2 and a motor wheel or gear 3 which mesh with each other, in which the former contributes to perform the programme wheel function, while the second receives the movement or driving torque from the escapement of the clock, not shown in the drawings as it is known per se.

The programmable system consists of the gears 1,2,4,5,6, and 7.

In particular, the motor gear 3 is a 24-tooth toothed wheel, of which only 7 are shown in the figures for simplicity's sake, which turns one circle per day, i.e. in 24 hours.

The wheel 2 is in fact a circular toothed crown, which is equipped with an external toothing 20 and an internal toothing 21; according to a preferred embodiment shown in the drawings, the external toothing 20 have 31 teeth (like the days of a month), while the internal one 21 has 26 teeth.

The external toothing 20 meshes with the drive wheel 3, as will be better seen below, while the internal toothing 21 is engaged by the internal wheel 1, which has a fixed and eccentric rotation axis with respect to that of the wheel 2, with eccentricity "2*e*" turned along the straight line Y which joins the rotation axes of the wheels 2 and 3.

The eccentric wheel 1 has a hypocycloidal rotary movement with respect to the internal toothing 21 of the toothed crown of the wheel 2 and in accordance with a preferred embodiment, it is obtained from a 24-tooth gear of which 18 are removed and only 6 are left, visible in the figures like 1*a*, 1*b*, 1*c*, 1*d*, 1*e*, 1*f*.

These teeth 1*a*-1*f* mesh with the internal toothing 21 (with 26 teeth) of the wheel 2; with this transmission ratio, at each circle of the wheel 2, the eccentric gear 1 advances by two teeth with respect thereto.

The external toothing 20 of the wheel 2 has a lower order of 31 complete teeth (representing the days of the month) and a higher order of three other sliding teeth, indicated with the numerical references 4, 5 and 6, arranged on the upper face thereof of the wheel 2.

The gear train thus formed is actuated by the drive wheel 3 (in turn connected to the gear train of time not shown in the figures, from which it takes its motion), which is designed to have 24 teeth (but not necessarily 24) of which only seven consecutive teeth 9, 10, 11, 12, 13, 14, 15 are present and which turns a full circle in 24 hours. Out of the seven teeth 9, 10, 11, 12, 13, 14, 15 only the central one 9 is full, i.e. it has a thickness equal to that of the band of the gear 3, while the other teeth 10, 11, 12, 13, 14, 15 extend only half or in any case over a part of the thickness of the gear itself. Further, as can be seen, the tooth 9 is in a central position with respect to the others and it precedes, in the direction of rotation of the drive wheel 3 (indicated by the arrow in the drawings), the teeth 10, 11, 12, while it follows the remaining ones 13, 14, 15. Said teeth 10-12 and 13-15 are positioned at the same level as the sliding ones 4, 5 and 6 on the wheel. The latter three guided on the wheel 2 mesh with the teeth 9-12 of the drive wheel 3 only when they are pushed outwards, being in the example shown normally returned to a rearward position by elastic contrast means (not represented here).

These elastic means (in the example shown) consist of springs 17, respectively housed inside the teeth 4, 5, 6, and protrude radially at the internal toothing 21 of the wheel 2. These teeth together with their guide system can be designed differently to eliminate the use of springs. It has been chosen to show the configuration illustrated so far for descriptive simplicity's sake.

The perpetual calendar device D further comprises an eight-tooth planetary gear 7 of which only three are whole, that is, which have a complete involute profile, which is pivoted on the eccentric wheel 1; the planetary gear 7 is engaged with a ten-tooth central gear or pinion 8, coaxial with the eccentric axis of rotation of the hypocycloidal wheel 1.

The operation of the perpetual calendar device D according to the invention takes place as follows.

Once a day, upon completion of one circle of the drive wheel 3, the tooth 9 meshes with the wheel 2, making it advance by one tooth which is equivalent to the advancement of 1 day in terms of calendar.

In doing so, the wheel 2 turns a circle in 31 days respecting the maximum length of the months.

However, when the device must represent one of the months of the year having a length of 30 days (e.g. April, June, September or November), upon the passage of the teeth of the drive wheel 3, the wheel 2 must be able to advance by two teeth (i.e. two days): i.e. from the tooth representing day 30 it must pass directly to the tooth representing day 1.

In the perpetual calendar device D according to the present invention, this is possible thanks to the cycloidal motion of the eccentric wheel 1 which allows one of its six teeth, which mesh with the internal toothing 21 of the programme wheel 2, to push outwards the first sliding tooth

Figure 3:
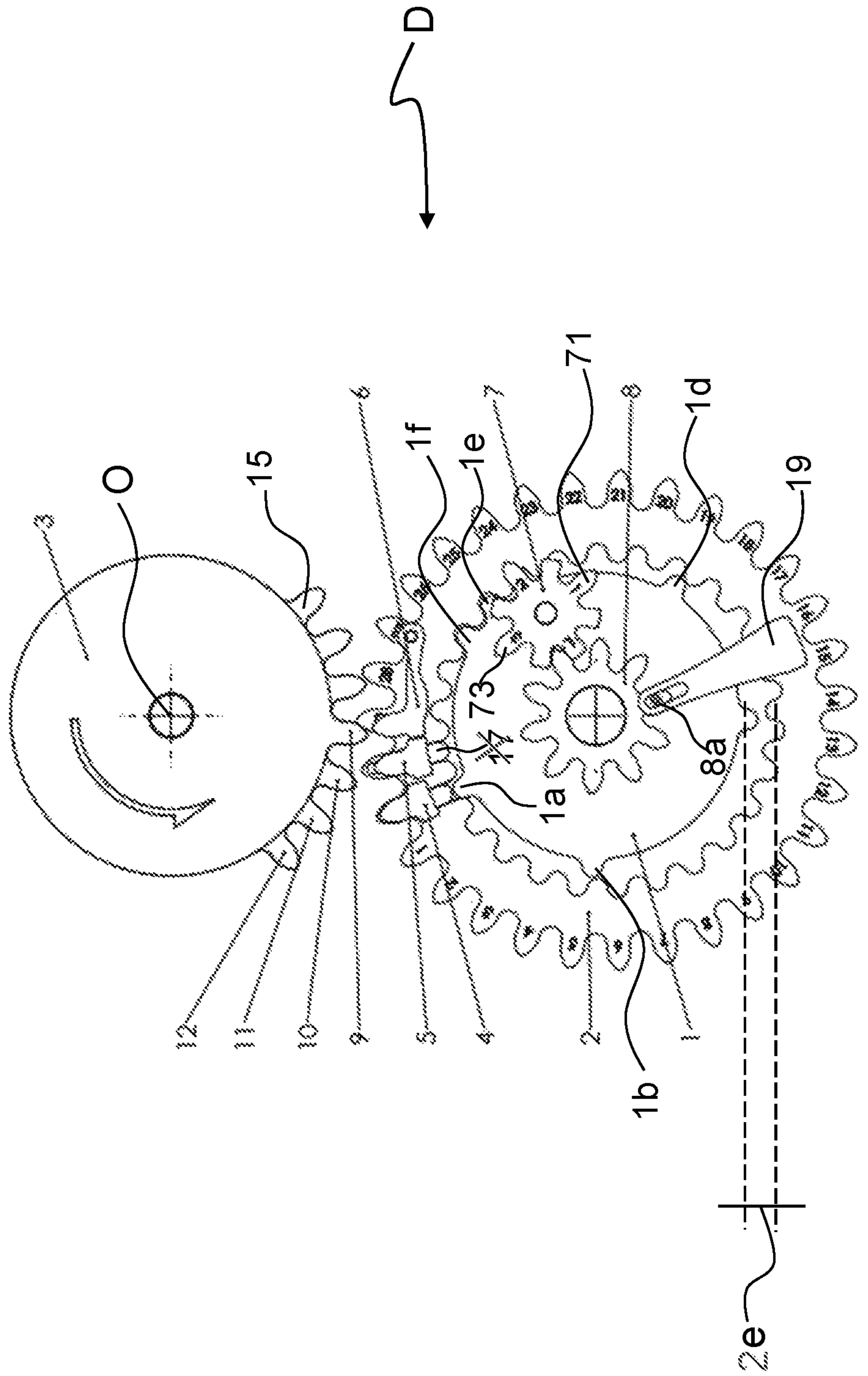

4 of the latter encountered in the direction of rotation (clockwise in FIGS. 3 and 4) of the wheel 2.

In doing so, the sliding tooth 4 meshes with the tooth 10 adjacent to the central whole one 9 of the drive wheel 3, making the driven wheel 2 advance by two teeth and thus actuating the passage from tooth 30 to tooth 1. This occurs four times a year, exactly at the months of April, June, September and November.

A particular case is then the month of February (FIG. 3) in which the passage from tooth (day) 28 to tooth (day) 1 is to be made, thus with an advancement of 4 teeth. This is possible thanks to the cycloidal movement of the wheel 1 in combination with the movement of the satellite gear 7.

The satellite gear 7 has in fact eight teeth, of which only three, indicated as 71, 72, 73, are full and respectively bear the numbers 1, 2 and 3 corresponding to the ordinary or non-leap years (i.e. 365 days) in which the month of February is 28 days long; the teeth 71, 72, 73 are used to push outwards the third tooth 6 of the movable ones, to make it mesh with the drive wheel 3.

Once a year the two adjacent teeth of the eccentric wheel 1 mesh at the teeth 4 and 5 of the programme wheel 2 pushing them outwards.

Under this circumstance, simultaneously, a whole tooth of the satellite wheel 7 pushes the sliding tooth 6 outwards.

In doing so, the whole tooth 9 of the wheel 3 pushes the wheel 2 from tooth 28 (corresponding to the homologous day) to tooth (day) 29, while the teeth 6, 5 and 4 meshing respectively with the teeth 10, 11, 12 make the driven wheel 2 advance by three positions. The total displacement thus achieved is by 4 teeth (i.e. days) from February 28 to March 1.

When the year is a leap year, at February 29, the satellite wheel 7 shows the tooth L (abbreviation of Leap) which, being without the tip, does not push the tooth 6 outwards. In doing so, the drive wheel 3 makes the wheel 2 advance by only three teeth corresponding to the passage from February 29 to March 1.

Figure 2:
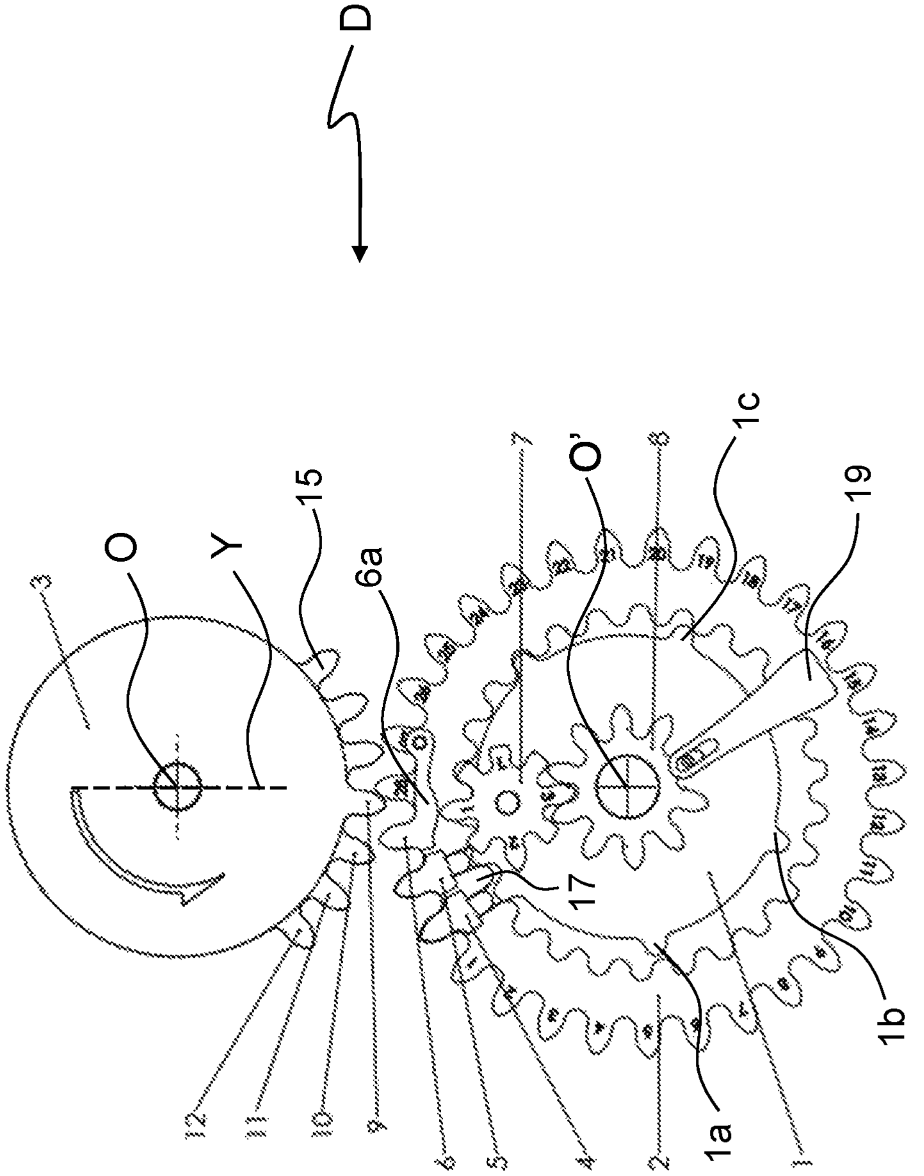
FIGS. 2 and 3 show a rear view of the previous device in respective operating conditions.

It should be noted that for this purpose the movable tooth 6, unlike the other two teeth 4 and 5, is preferably made on a lever arm 6*a* which acts as a cam, so as to be able to push the tooth 6 radially outwards when the planetary gear 7 reaches the position corresponding to a complete revolution (FIG. 2), that is, every four years.

This is in fact the revolution period of the satellite gear 7 around the pinion 8; for this purpose the latter is supported in a position coaxial with the eccentric wheel 1 by an arm 19, extending radially with respect thereto starting from the wheel 2. Advantageously, the end of the arm 19 has a groove 19*a* engaged by a peg 8*a* projecting from the upper face of the pinion 8, so as to substantially form a glyph mechanism which transmits the rotations of the wheel to the pinion 8.

The groove 19*a* allows to compensate the relative movements between the arm 19 and the pinion 8 during the rotations, caused by the eccentricity of the rotations, being the first integral with the programme wheel 2 and the second with the hypocycloidal wheel 1 which is eccentric with respect thereto.

The arm 19 configured as a bridge overlying the eccentric wheel 1 allows the passage of the planetary gear 7 thereunder.

From what has been described so far, it is possible to understand how the device D according to the invention allows to solve the underlying technical problem.

In fact, it is not difficult to recognise how de facto it consists of a gear train with a drive wheel 3 and a driven wheel 2 with which the eccentric wheel 1 is internally associated; it follows that with these three main components and the addition of the planetary gear 7 with the pinion 8 it is possible to obtain a perpetual calendar with a limited number of pieces and compact size, which can therefore be used in wristwatches as well as in table or wall clocks.

In fact the teeth 4-5-6 can be made integral with the body of the wheel 2 by using the concept of compliant mechanism.

A further result achieved by the device according to the invention is that it does not require additional hands or discs to indicate the days, months or leap years but it instead allows an immediate display of the information and therefore greater ease of reading.

In fact, as can be seen, the indication of the days and months derives directly from the position of the eccentric wheel 1 with respect to the wheel 2, whereas that of the year is the indirect derivation consequent to the movement of the planetary gear 7, associated with the eccentric wheel.

According to a possible preferred embodiment, the months are shown on the hypocycloidal wheel 1.

Figure 4:
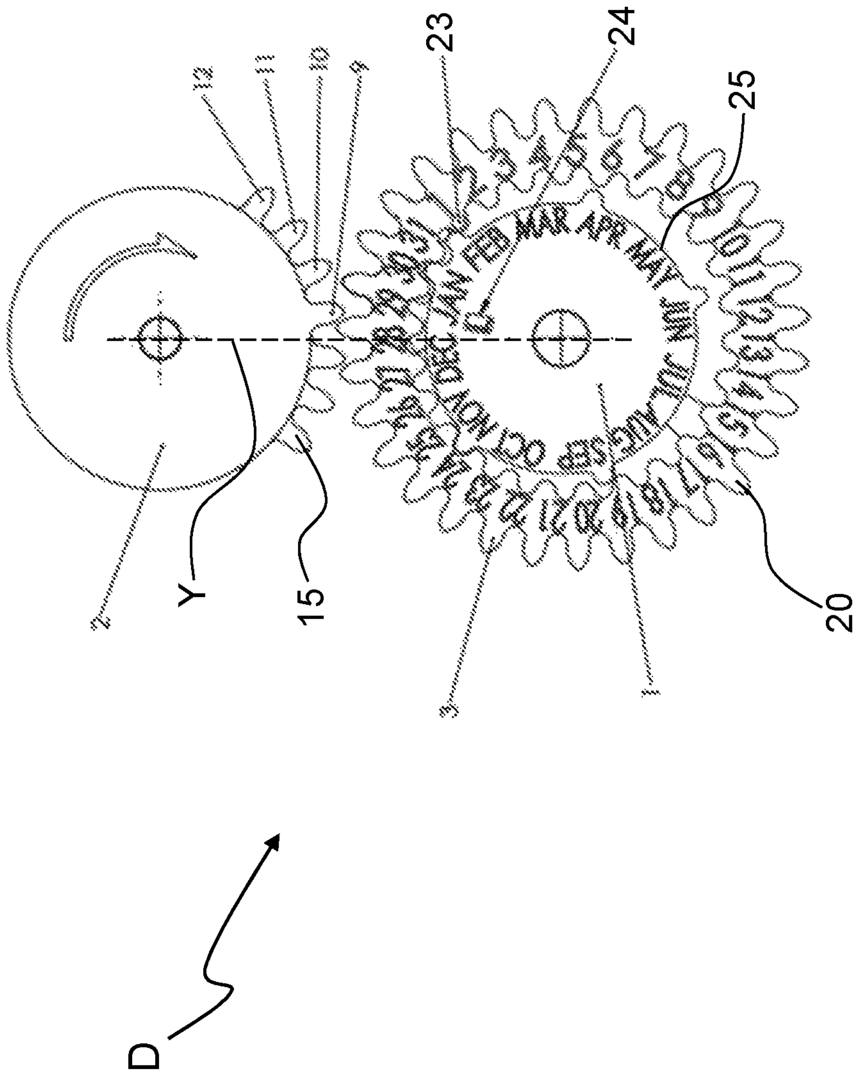
FIG. 4 shows a front view of the device of the previous figures.
Figure 5:
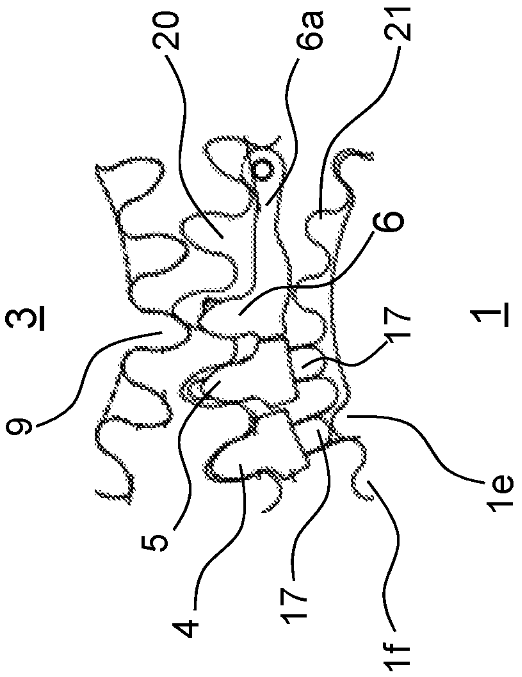
FIG. 5 shows a detail of the device of the previous figures.

Even more preferably, this indication can be reported on a tag, a plate, a cover or a surface 25, also totally or partially transparent, applied on the wheel 1 on the opposite side with respect to the one where the gear 7 and the pinion are located. 8; this surface can also comprise one or more openings 24, through which corresponding information can be displayed, such as for example the years in the case shown in FIG. 4, but also others.

It should also be stressed that this principle can be applied more broadly and generally to all indications that can be used in watchmaking, such as the days of the week, the moon phases, the zodiacal symbols, or colours or other; in such cases it is possible to show the required indications also on the driven wheels 1 and 2 or use the seven teeth 9-15 present thereon to control an additional gear.

In this context, it should be noted that the exposed principles underlying the invention can also be used to indicate other functions of the clock, such as for example its load level of the clocks.

The load level can be displayed using various types of indices, for example alphanumeric (e.g. fractions ¼, ½, ¾ or P for full, M for medium and B for low, or similar) or with colours (e.g. green, yellow, red), mixed solutions and whatever.

The device D thus conceived is in any case reliable having a limited number of components with respect to those known in the art and does not require lubrication, since the toothed couplings are essentially of the shape type and do not generate high frictions.

For this purpose it should be noted that the profile of the sides of the teeth of the gears shown in the drawings is of the involute type in circumference as this promotes torque transmission by reducing frictions; however other profiles may be used, for example for the eccentric wheel 1 the teeth thereof could be cycloidal in profile.

All these variants however fall within the scope of the following claims.

The invention claimed is:

1. An indicator device for watchmaking comprises:

a toothed drive wheel;

a programme wheel coupled with the toothed drive wheel, the programme wheel configured as a circular crown comprising an external toothing and an internal toothing; and an internal toothed wheel engaged cycloidally with the internal toothing of the programme wheel, wherein information shown on the programme wheel is associated with a position of the internal toothed wheel, wherein the programme wheel comprises a band of upper teeth, movable between an advanced position in which the band of upper teeth is aligned with respect to the teeth of the external toothing of the programme wheel, and a rearward position in which the band of upper teeth is retracted with respect to said external toothing, wherein a planetary gear is configured to act at the band of upper teeth of the programme wheel, for displacing said band of upper teeth between the advanced position in which the band of upper teeth is aligned with respect to teeth of the external toothing of the programme wheel, and the rearward position in which the band of upper teeth are retracted with respect to the external toothing of the programme wheel.

2. The device according to claim 1, wherein the internal toothed wheel is eccentric with respect to the programme wheel.

3. The device according to claim 2, wherein an eccentricity of the internal toothed wheel is directed along a straight line joining rotation centres of the toothed drive wheel and the programme wheel.

4. The device according to claim 3, wherein the internal toothed wheel comprises a plurality of teeth arranged in predetermined circumferential points, as a function of the information associated with the programme wheel to be indicated.

5. The device according to claim 4, wherein the band of teeth is associated with an elastic contrasting means for the return to a retracted or advanced condition.

6. The device according to claim 5, wherein the toothed drive wheel comprises a plurality of teeth having reduced extension in a longitudinal direction or in any case over a part of a thickness of the toothed drive wheel, and at least a complete tooth, that is extended over the thickness of the toothed drive wheel, in which the plurality of teeth with reduced extension mesh with the programme wheel under predetermined conditions.

7. The device according to claim 6, wherein the planetary gear is engaged with a central gear, wherein the central gear is coaxial with a rotation axis of the internal toothed wheel.

8. The device according to claim 6, wherein the external toothing of the programme wheel has 31 teeth, while the drive wheel is configured to turn a circle in 24 hours.

9. The device according to claim 8, wherein the drive wheel has at least 24 teeth, a toothing of 24 divisions limited to a circumferential sector.

10. A clock comprising a perpetual calendar, and at least one device according to claim 1.

* * * * *